United States Patent
Kim et al.

(10) Patent No.: US 7,634,113 B2
(45) Date of Patent: Dec. 15, 2009

(54) USER AUTHENTICATION SYSTEM AND METHOD THEREOF

(75) Inventors: Do-Hyung Kim, Daejeon (KR); Jae-Yeon Lee, Daejeon (KR); Su-Young Chi, Daejeon (KR); Ho-Sub Yoon, Daejeon (KR); Kye-Kyung Kim, Daejeon (KR); Soo-Hyun Cho, Daejeon (KR); Hye-Jin Kim, Incheon (KR); Young-Jo Cho, Seongnam (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 700 days.

(21) Appl. No.: 11/291,607

(22) Filed: Nov. 30, 2005

(65) Prior Publication Data

US 2006/0120569 A1    Jun. 8, 2006

(30) Foreign Application Priority Data

Dec. 7, 2004  (KR) .................. 10-2004-0102473
Aug. 11, 2005 (KR) .................. 10-2005-0073782

(51) Int. Cl.
 *G06K 9/00* (2006.01)
 *G06K 5/00* (2006.01)
 *G05B 19/00* (2006.01)
 *G10L 21/00* (2006.01)
(52) U.S. Cl. .................. 382/115; 235/380; 340/5.1; 704/246
(58) Field of Classification Search ......... 382/115–127, 382/190; 235/380; 340/5.1–5.92
See application file for complete search history.

(56) References Cited

U.S. PATENT DOCUMENTS

| 5,850,470 A | 12/1998 | Kung et al. |
| 2004/0133582 A1* | 7/2004 | Howard et al. ............... 707/100 |
| 2004/0234108 A1* | 11/2004 | Li et al. ....................... 382/116 |

FOREIGN PATENT DOCUMENTS

| JP | 2004-295813 | 10/2004 |
| KR | 2003-0076905 | 9/2003 |
| KR | 2003-0091345 | 12/2003 |

* cited by examiner

*Primary Examiner*—Brian P Werner
*Assistant Examiner*—Randolph Chu
(74) *Attorney, Agent, or Firm*—Blakely, Sokoloff, Taylor & Zafman LLP (57) ABSTRACT

A user recognizing system and method is provided. According to the user recognizing system and method, user ID and predetermined user feature information are stored, first and second user feature information are extracted from the user image data transmitted from the image input unit, and first and second probabilities that the extracted first and second user feature information determine the predetermined user are respectively generated based on the information stored at the user information database, the first user feature information being absolutely unique biometric information and the second user feature information being unique semibiometric information under a predetermined condition, and ID of the input image is finally determined by combining the first probability and the second probability. According to the user recognizing system and method, a user identity can be authenticated even when the user freely moves.

7 Claims, 9 Drawing Sheets

Background Image

FIG.2B

Background and User Image

FIG.2C

Differential Image

USER AUTHENTICATION SYSTEM AND METHOD THEREOF

CROSS-REFERENCE TO RELATED APPLICATION

This application claims priority to and the benefit of Korean Patent Applications Nos. 10-2004-0102473 & 10-2005-0073782 filed in the Korean Intellectual Property Office on Dec. 7, 2004 & Aug. 11, 2005 the entire contents of which are incorporated herein by reference.

BACKGROUND OF THE INVENTION (a) Field of the Invention

The present invention relates to a user recognizing system and a method thereof. More particularly, the present invention relates to a user recognizing system and a method thereof capable of verifying the corresponding user based on a user image captured by an image camera.

(b) Description of the Related Art

Generally, a password, a key, a card, and the like have been used in order to verify a personal identity. However, a password is subject to be forgotten and a key or card is subject to be lost or stolen. Accordingly, a biometric recognizing method has been developed to verify a personal identity using biometric features belonging to respective persons.

However, such a biometric recognizing method is mainly designed to for security. Accordingly, it is required that user information will be obtained only under a strictly restricted environment or when a user positively cooperates in providing user information. However, when a system, such as a robot, authenticates a user identity it is difficult to strictly restrict the environment or to expect that the user will positively cooperate in providing user information.

For example, in the case that a robot system authenticates a representative biometric feature, that is, a face, based on the user recognizing method, the robot system can exactly authenticate a user's face only when the user views a camera at the front thereof under predetermined illumination conditions.

Therefore, such restrictions can be applied to a security system, but cannot be applied to general systems.

Recently, in order to solve the above problems, a method for modeling a face in a 3D image capable of authenticating a user identity regardless of intensity of illumination or a direction of the face has been developed. However, the method cannot yet solve the above problems when the user is viewed from behind or when the user is very far away from the robot system such that the face is too small for the robot system to authenticate.

Therefore, a method for reliably authenticating a user under more variable environments, which the system will confront with various users, is severely required in a system, such as a robot, requiring user recognizing.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a user recognizing system and method having advantages of reliably authenticating a user, regardless of the variable environment between the recognizing system and the target to be authenticated, by using user feature information easily obtained in comparison with a biometric feature such as a fingerprint or a face.

An exemplary user recognizing system according to an embodiment of the present invention includes a user information database, an image input unit, a feature recognizing unit, and a user determination unit, wherein the user information database includes user ID and predetermined user feature information, the image input unit digitalizes the user image and transmits the digitalized data into the system, the feature recognizing unit extracts first and second user feature information from the user image data transmitted from the image input unit and respectively generates first and second probabilities that the extracted first and second user feature information determine the predetermined user based on the information stored at the user information database where the first user feature information is absolutely unique biometric information and the second user feature information is unique semibiometric information under a predetermined condition, and the user determination unit finally determines ID of the input image by combining the first probability and the second probability.

An exemplary user recognizing method according to an embodiment of the present invention includes a) storing user ID and predetermined user feature information, b) extracting first and second user feature information from the user image data transmitted from the image input unit, and respectively generating first and second probabilities that the extracted first and second user feature information determine the predetermined user based on the information stored at the user information database, where the first user feature information is absolutely unique biometric information and the second user feature information is unique semibiometric information under a predetermined condition, and c) finally determining ID of the input image by combining the first probability and the second probability.

DATAILED DESCRIPTION OF THE EMBODIMENTS

An exemplary embodiment of the present invention will hereinafter be described in detail with reference to the accompanying drawings.

Figure 1:
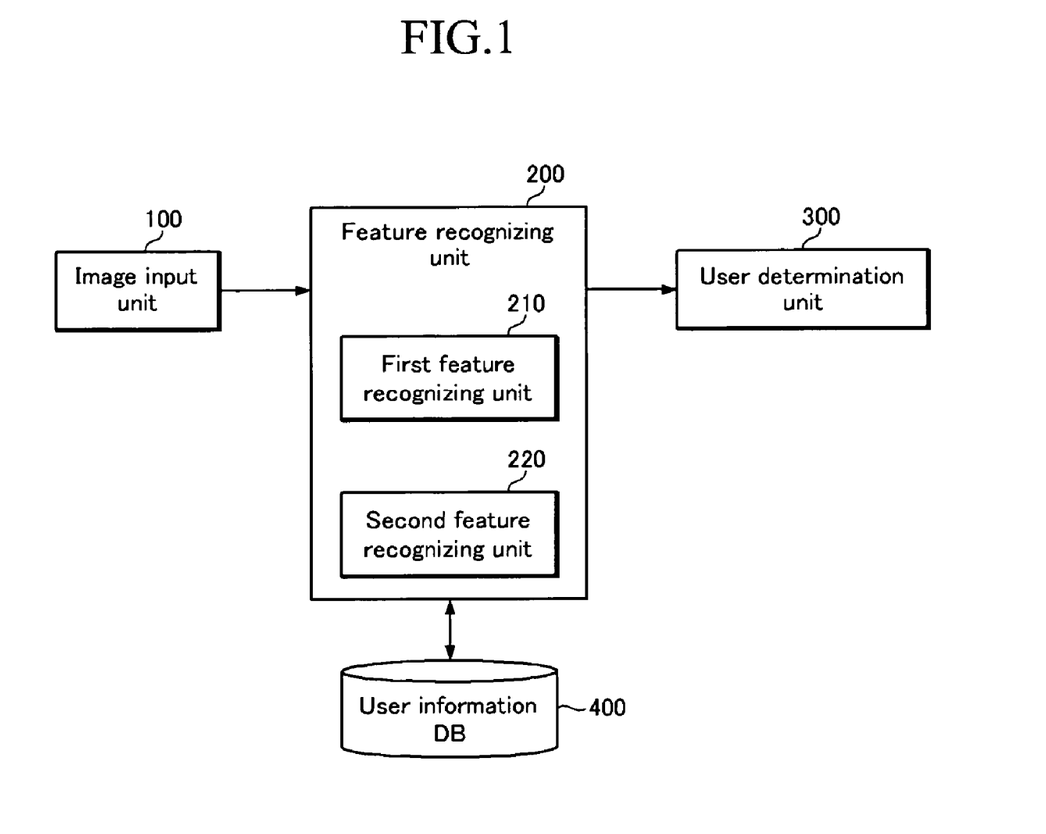
FIG. 1 is a schematic diagram of a user recognizing system according to an exemplary embodiment of the present invention.

As shown in FIG. 1, a user recognizing system according to an exemplary embodiment of the present invention includes an image input unit 100, a feature recognizing unit 200, a user determination unit 300, and a user information database 400.

The image input unit 100 forms a user image in data and inputs the user image data into the system. For example, the image input unit 100 may input a camera image, obtained by a camera, into a computer and form a bit-map pattern by digitalizing the camera image.

The feature recognizing unit 200 extracts user feature information from the user image data transmitted from the image input unit 100 and generates a probability of a predetermined user being determined by the extracted user feature information.

In more detail, the feature recognizing unit 200 includes a first feature recognizing unit 210 and a second feature recognizing unit 220, the first feature recognizing unit 210 and the second feature recognizing unit 220 respectively generating probabilities that a predetermined user is determined by the first and second user feature information extracted from the input image.

In this case, the first features involve unique biometric feature information, such as face information and fingerprint information. Generally, such features are unchangeable during a lifetime and are unique for everybody.

Meanwhile, the second features are unique for users of a predetermined group and are unchangeable during a predetermined period, hereinafter called semibiometric features. For example, the second features involve practical feature information, such as height, bodyline, weight, hair color, and cloth color, which can identify a respective user within a predetermined group.

In this embodiment, for convenient description and as an example, a face may be used as the first feature and height may be used as the second feature.

The first feature recognizing unit 210 checks whether there is the target face image to be authenticated among the image data obtained from the image input unit 100, and on there being the target face image, extracts the face feature information from the image data. Next, the first feature recognizing unit 210 compares the extracted face feature information with the registered face feature information, which the user information database 400 stores and registers for the respective users of a predetermined group, and generates probabilities PF,Ui for all registered users that a predetermined user Ui will be determined by the input image.

The second feature recognizing unit 220 checks whether a height can be calculated by the image data obtained from the image input unit. When the height can be calculated, the second feature recognizing unit 220 calculates the height and transmits the calculated height to the user information database 400. The user information database 400 stores the calculated height and compares the same with the registered height information of the registered user group.

In addition, the second feature recognizing unit 220 generates probabilities PH,Ui for all users of the registered user group that a predetermined user Ui will be determined by the input image.

The user determination unit 300 finally determines a predetermined user by combining the probabilities {PF,U1, PF,U2, ..., PF,UN} and {PH,U1, PH,U2, ..., PH,UN}, respectively generated by the first feature recognizing unit 210 and the second feature recognizing unit 220.

Now, the second feature recognizing unit 220 will be described in more detail with reference to FIG. 2 through FIG. 6.

Generally, height is a very useful biometric feature for a system such as a home application robot in that the users of a group, such as a family, have very different heights. However, when height is measured using an image, it must be considered that the height is dependent on a scale.

When a user becomes closer to the camera, the shape thereof becomes larger, and when the user becomes farther from the camera, the shape thereof becomes smaller. Accordingly, it is difficult to measure height with only the shape captured by an image. In order to correct such shape variance, it is necessary to also have distance information, measured from the camera to the user.

Conventionally, in order to measure a distance, a distance sensor, such as a laser scanner or a stereo matching method using a plurality of cameras, has been used. However, the laser scanner is expensive and it is difficult to apply the stereo matching method to an inexpensive system using one camera. Therefore, it is required to be able to measure height with only one camera.

First, a user silhouette should be extracted from the image information. In this case, such a silhouette may be extracted by various methods.

Figure 2A:
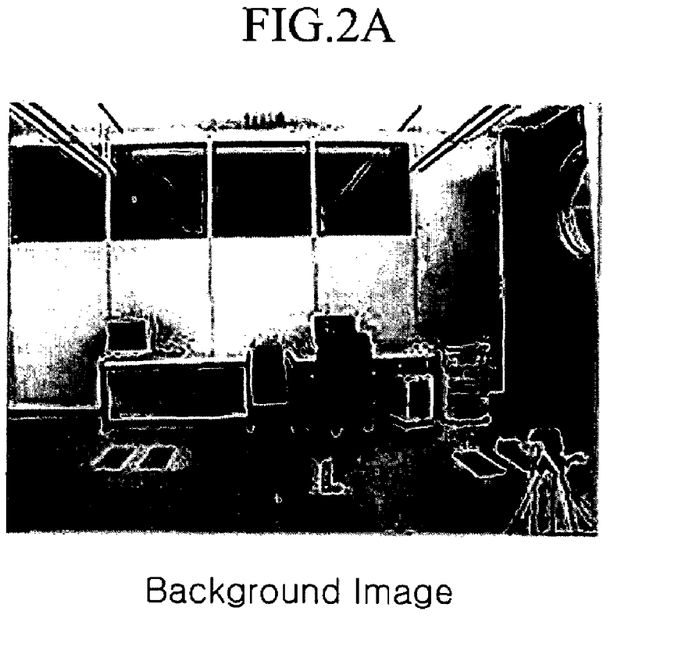
FIG. 2A to FIG. 2C show a method for extracting a silhouette of a person from an image according to an exemplary embodiment of the present invention.
Figure 2B:
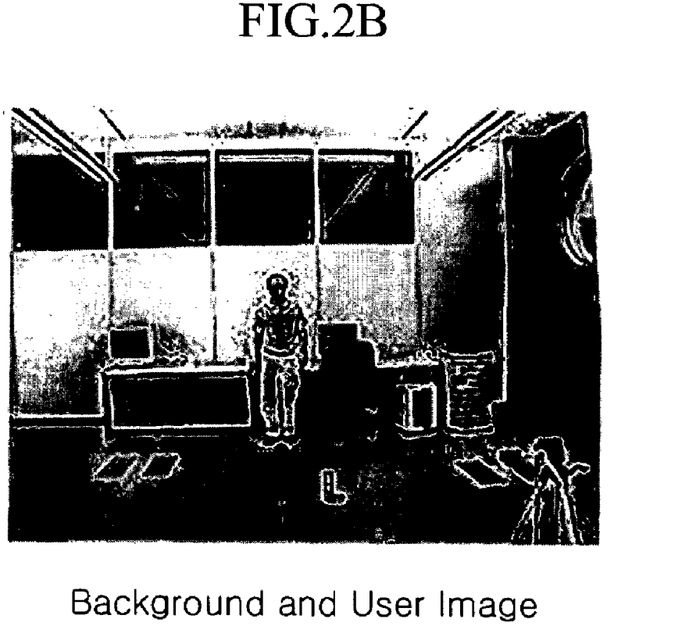

For example, a user silhouette may be extracted by using a background image of FIG. 2A and a background and user image of FIG. 2B by the background subtraction method. That is, when the background image of FIG. 2A, which has been previously memorized, is subtracted from the background and user image of FIG. 2B, the user silhouette image of FIG. 2C can be extracted.

Figure 2C:
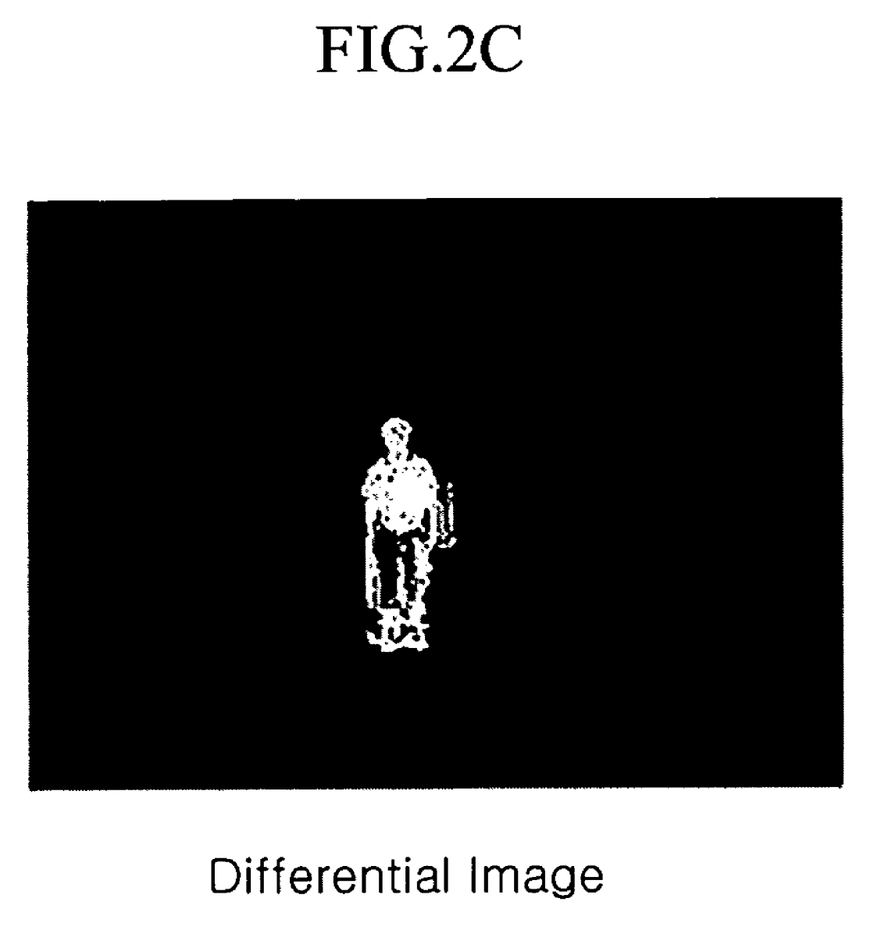

After extracting the user silhouette image in this manner, the height may be measured. In this case, three assumptions will be required as follow.

Assumption 1. A robot, mounted with a camera, is placed in parallel with a person.

Assumption 2. A user stands fully erect.

Assumption 3. There is a full length of the user in the camera view.

Figure 3:
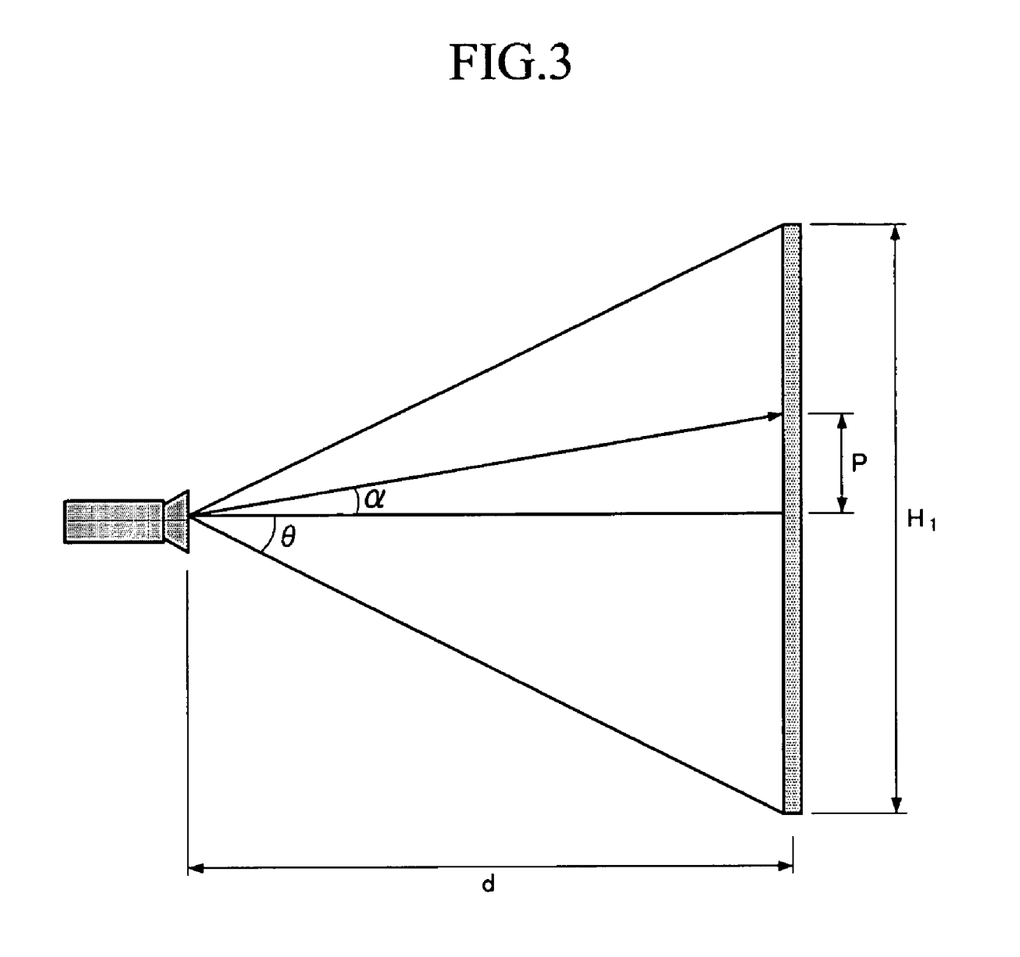
FIG. 3 illustrates a method for converting lengths measured by a pixel scale from an image to angels of view.

Next, as shown in FIG. 3, when an angle θ corresponding to a field of view of the camera is given as a previously measured value, an angle corresponding to a predetermined pixel P may be calculated in proportion to angle θ in Equation 1.

$$\alpha = \arctan\left(\frac{2P \tan(\theta)}{H_I}\right) \quad \text{(Equation 1)}$$

That is, when a distance D is from the camera to the image plane, $$\tan(\theta) = \frac{H_I}{2D} \quad 1)$$

$$\tan(\alpha) = \frac{P}{D} \quad 2)$$

Equation 3) may be obtained from above Equations 1) and 2), $$\tan(\alpha) = \frac{2P\tan(\theta)}{H_l} \quad 3)$$

Equation 1 can be induced from these equations.

Figure 4:
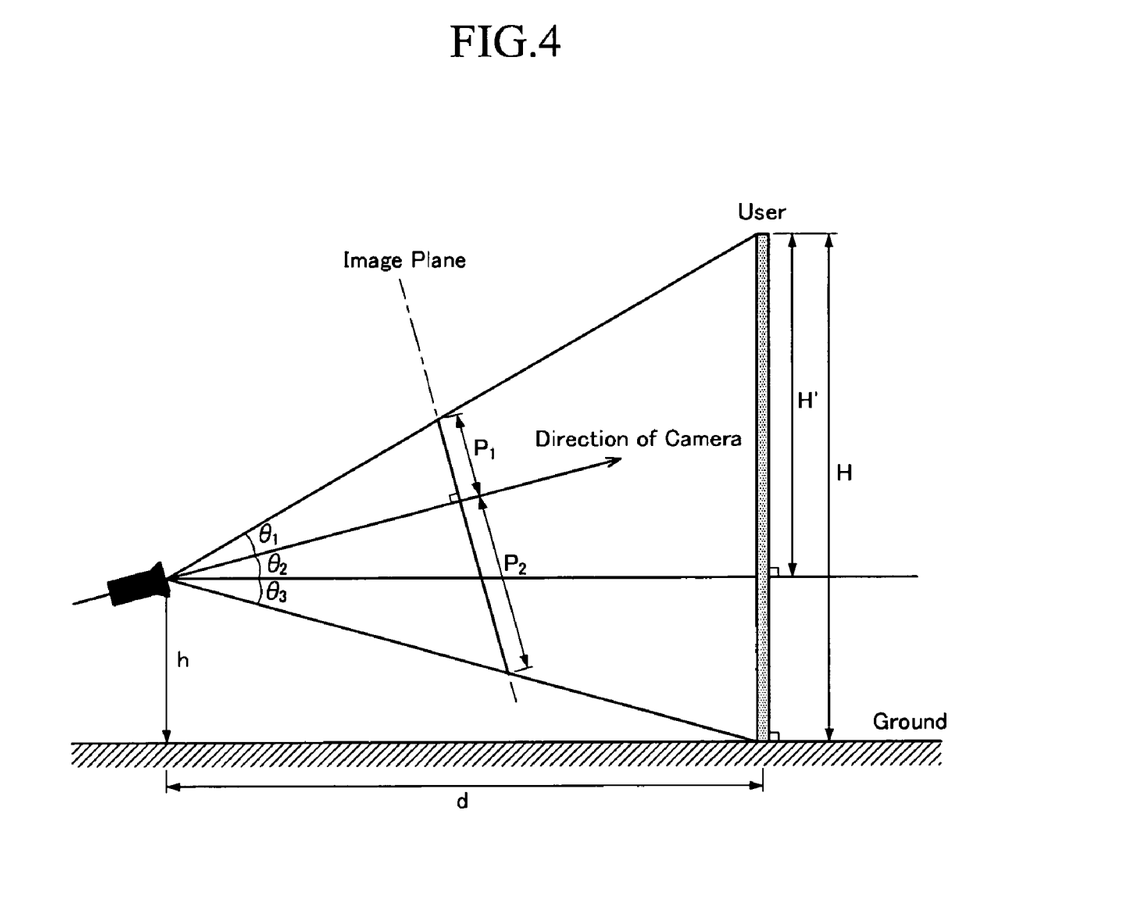
FIG. 4 illustrates a method for measuring a height when a camera views upward (in the case of having a positive tilt angle).

FIG. 4 illustrates a method for measuring height when a camera views upward (in the case of having a positive tilt angle).

Since a height of a robot to be mounted with the camera is previously known, a height h measured from a bottom plane to the camera is given, and since tilt angle θ2 is controlled by a robot, the tilt angle θ2 is given.

In this case, pixel-scale distances P1 and P2 can be obtained by extracting a silhouette from the image information, and then the distances P1 and P2 are respectively measured from the crown of the head of the silhouette to the vertical center and from the vertical center to the base as shown in FIG. 4.

Ultimately, in order to obtain a height H, the distances P1 and P2 are used to calculate angles θ1 and θ3. Assuming a Pin Hole Camera Model while not considering a camera distortion, the angles θ1 and (θ2+θ3) can be obtained by the Equation 1.

That is, in Equation 1, P respectively corresponds to P1 and P2, and (alpha) corresponds to the angles θ1 and (θ2+θ3), $$\theta 1 = \arctan\left(\frac{2P_1 \tan(\theta)}{H}\right) \quad 4)$$

$$(\theta 2 + \theta 3) = \arctan\left(\frac{2P_2 \tan(\theta)}{H}\right) \quad 5)$$

In addition, since the angle θ2 is controlled by the robot, it can be given. As a result, all the angles θ1, θ2, and θ3 can be obtained.

Accordingly, using the angles θ1, θ2, and θ3, a distance d from the camera to the user can be obtained.

$$d = \frac{h}{\tan(\theta_3)} \quad \text{(Equation 2)}$$

When the distance d has been obtained by Equation 2, the height H' corresponding to a difference of the camera height h and the user height H may be obtained by Equation 3.

$$H' = d \cdot \tan(\theta_1 + \theta_2) \quad \text{(Equation 3)}$$

Finally, the user height H can be obtained by combining Equation 2 and Equation 3 as follows.

$$H = h + H' = h + \frac{h \cdot \tan(\theta_1 + \theta_2)}{\tan(\theta_3)} \quad \text{(Equation 4)}$$

Figure 5:
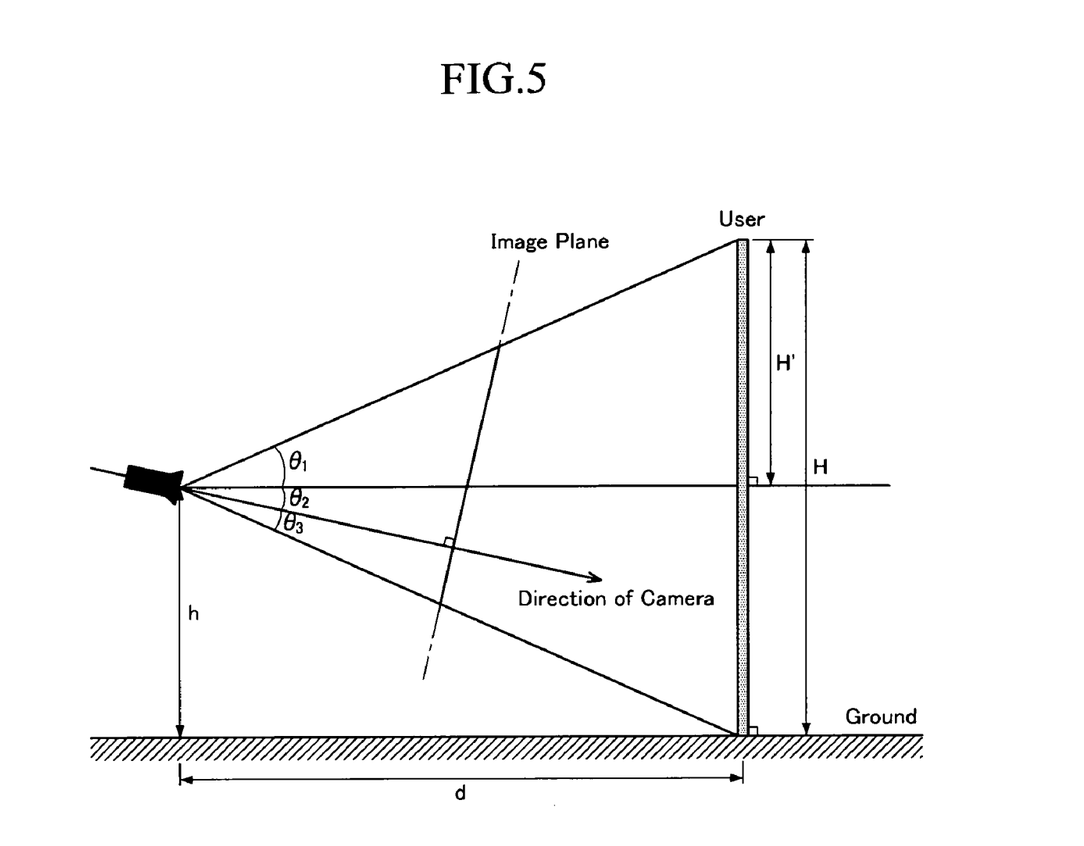
FIG. 5 illustrates a method for measuring a height when a camera views downward (in the case of having a negative tilt angle).

FIG. 5 illustrates a method for measuring a height when a camera views downward (in the case of having a negative tilt angle). Also in this case, Equation 5 can be induced through the same process as described above.

$$H = h + \frac{h \cdot \tan(\theta_1)}{\tan(\theta_2 + \theta_3)} \quad \text{(Equation 5)}$$

Next, the second feature recognizing unit 220 compares the measured height H with the stored user heights, which the user information database 400 stores for the registered user group. The user determination unit 300 finally determines a predetermined user by combining the recognizing result of the second feature recognizing unit 220 and the recognizing result of the first feature recognizing unit 210. Accordingly, the recognizing result of the second feature recognizing unit 220 does not specify a corresponding user, but expresses a probability that a predetermined user Ui will be determined.

Generally, a probability in which a predetermined user Ui will be determined by the measured height is dependent on two aspects. In more detail, the probability depends on how precise the measured height is and how reliable a probability is that a predetermined user Ui will be determined depending on the user height differences in the targeted group.

That is, if the height is inaccurately measured, although the measured height approximates to the registered height of the specific user Ui, the reliability may become lowered. In addition, although the height is accurately measured, if two users having similar height are in the same group, the reliability may become lowered.

Considering theses problems, the probability in which a predetermined user Ui will be determined based on the measured height is obtained as follows.

Figure 6:
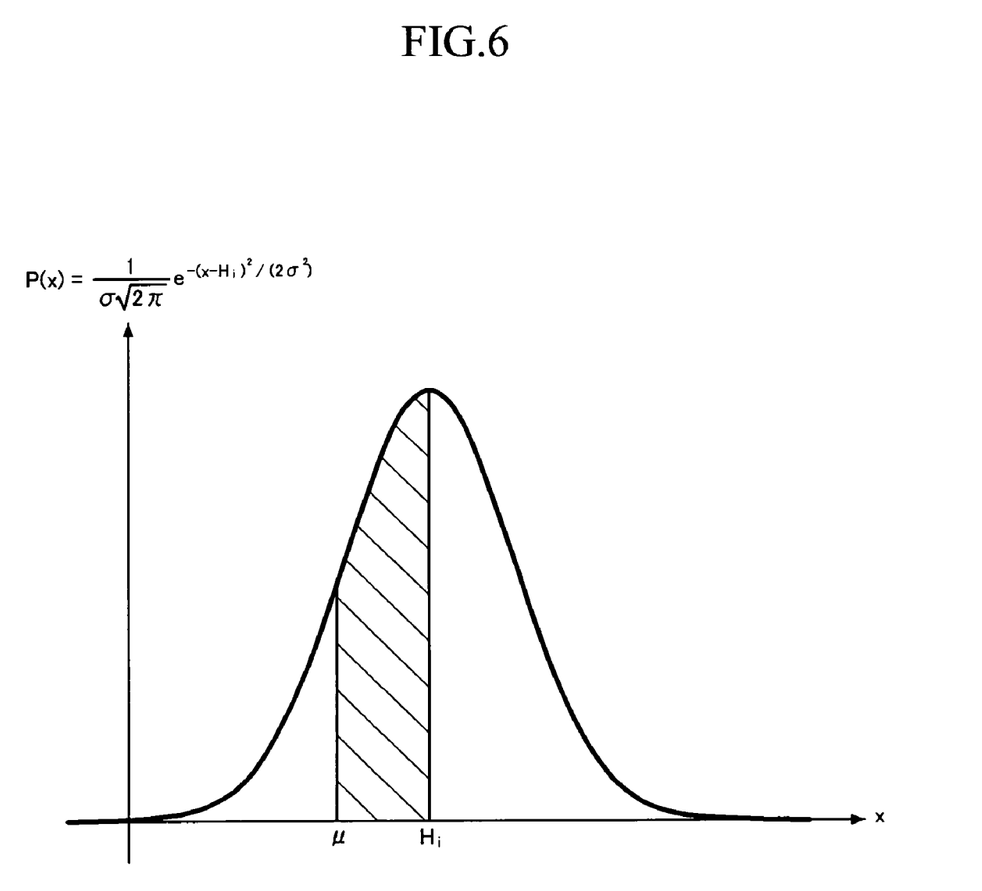
FIG. 6 illustrates a method for measuring a probable distance between a height measured through a probability density function and a height registered at a user information database.

First, as shown in FIG. 6, the accuracy of the height measurement is expressed by the normal distribution of the standard deviation σ, wherein the standard deviation σ is given through repeated experiments.

When the measured result μ is given using the above-described height measuring method, probable distances for the respective registered heights Hi, expressed in the shaded portion in FIG. 6, are calculated using Equation 6.

$$D = \int_{\mu}^{Hi} P(x) dx \quad \text{(Equation 6)}$$

In this case, the maximum value of the shaded portion is given as 0.5, a value obtained by subtracting the actual shaded portion from the maximum value 0.5 is given as a temporary probability P'(Ui). In addition, after the probability P'(Ui) is calculated for all users of the group, the final probability P(Ui) normalized such that the sum of the temporary probability P'(Ui) becomes 1 is calculated using Equation 7.

$$P_{H,U_i} = \frac{P'_{H,U_i}}{\sum_{k=1}^{N} P'_{H,U_k}} \quad \text{(Equation 7)}$$

In this manner, how precisely the height is measured is used to determine a user and to provide a probability for people having a similar height within the same group. Thereafter, it is combined with other user feature recognizing results such that the user determination unit 300 can provide an appropriate result. For example, according to an exemplary embodiment of the present invention, the user determination unit 300 can appropriately determine a specific user by using the face recognizing result obtained by the first feature recognizing unit 210.

Meanwhile, the user determination unit 300 finally determines a specific user by combining the first feature recognizing result with the second feature recognizing result.

In this case, since the measured user feature may not satisfy the standard of the user determination unit 300, the first feature recognizing unit 210 and the second feature recognizing unit 220 may provide a valid result or an invalid result by measuring the user feature from the image obtained through the image input unit 100.

For example, the first feature recognizing unit 210 may authenticate a user face feature, when the two eyes are simultaneously detected for the front face. Also, the second feature recognizing unit 220 may measure the height, when the above assumption 3 that the full length of the person is within the image view of the camera is satisfied.

When the first feature recognizing unit 210 and the second feature recognizing unit 220 provide a valid result by measuring a user feature, the first feature recognizing unit 210 and the second feature recognizing unit 220 respectively generate the results {PX,U1, PX,U2, . . . ,PX,UN} corresponding to Equation 7 for all the users of the group. That is, when the first feature recognizing unit 210 measures a user face, X is given as F, and when the second feature recognizing unit 220 measures a user height, X is given as H.

In addition, the first feature recognizing unit 210 or the second feature recognizing unit 220 may provide an invalid result, and then all values ranging from PX,U1 to PX,UN are set as 1/N. Accordingly, the respective recognizing results have no effect on the final probability.

The user determination unit 300 multiplies the probabilities respectively generated by the first feature recognizing unit 210 and the second feature recognizing unit 220 so as to obtain a final probability that a predetermined user Ui will be determined. That is, P'Ui that a predetermined user Ui will be determined is obtained using the results list of the respective feature recognizing units as follows.

$$P'_{Ui} = P_{F,Ui} \cdot P_{H,Ui}$$ (Equation 8)

In addition, the final probability PUi is generated by normalizing the obtained P'Ui as follows.

$$P_{U_i} = \frac{P'_{U_i}}{\sum_{k=1}^{N} P'_{U_k}}$$ (Equation 9)

The user determination unit 300 obtains the list of PUi through Equation 9 and determines the user ID of the maximum PUi to be a predetermined user among the list.

In this manner, two types of recognizing information involved in the system may be appropriately combined, and also, information on how reliable the final result is may be provided.

Figure 7:
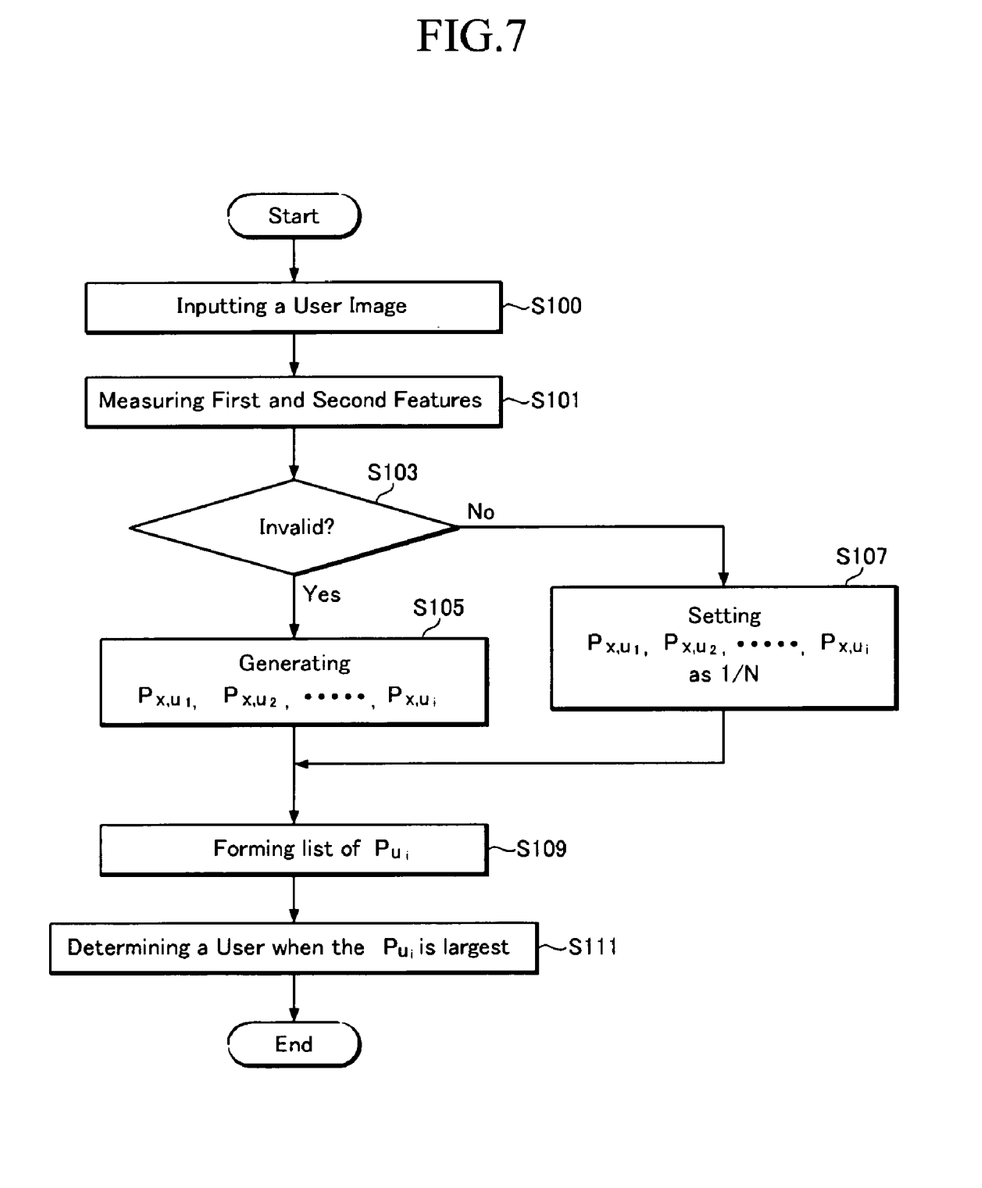
FIG. 7 is a flowchart illustrating a user recognizing method according to an exemplary embodiment of the present invention.

Now, a user recognizing method is briefly described according to an exemplary embodiment of the present invention with reference to FIG. 7.

First, when the image input unit 100 digitalizes a user image and transmits the digitalized image data into the system (S100), the feature recognizing unit 200 extracts the user feature information from the data transmitted from the image input unit 100 and generates the probability that a predetermined user is determined by the extracted user feature information (S101).

In more detail, the feature recognizing unit 200 includes the first feature recognizing unit 210 and the second feature recognizing unit 220, and generates the respective probabilities that the user captured through the input image will be a predetermined user by extracting the respective first feature and the second feature information from the input image. In this case, the first features involve unique biometric features for the respective users. In addition, the second features involve semibiometric features which are different within the predetermined group and unchangeable during the predetermined period. For convenient description, a face may be exemplarily used as a first feature of the user and height may be exemplarily used as a second feature.

When the measured result of the feature recognizing unit 200 is valid—the first feature recognizing unit 210 can authenticate a user face feature since the two eyes are simultaneously detected for the user face, and the second feature recognizing unit 220 can measure the height since the full length of the person is within the image view of the camera, and so the results {PX,U1, PX,U2, . . . ,PX,UN} corresponding to Equation 7 are generated for all the users of the group (S103, S105). In this case, when X is given as F, the results {PX,U1, PX,U2, . . . ,PX,UN} express that the measurement result of the first feature recognizing unit 210 is a user face, and when X is given as H, the results {PX,U1, PX,U2, . . . ,PX,UN} express that the measurement result of the second feature recognizing unit 220 is a user height.

Meanwhile, when the measured result of the feature recognizing unit 200 is invalid, all values ranging from PX,U1 to PX,UN are set as a 1/N so that the respective recognizing results have no effect on the final probability (S103, S107).

Next, the user determination unit 300 multiplies the probabilities respectively generated by the first feature recognizing unit 210 and the second feature recognizing unit 220 so as to obtain a final probability that a predetermined user Ui will be determined (S109). That is, the user determination unit 300 forms the list of PUi in which a predetermined user Ui will be determined, using Equation 9 (S109).

A user with a maximum value PUi is determined as the predetermined user (S111).

Meanwhile, in this embodiment, it is known that the distance d from the camera to the user can be obtained in Equation 2.

Generally, in the robot system, 3D information is important, and particularly, distance information is important so as to avoid an obstacle or to track a target. Accordingly, systems and methods for obtaining a distance have been developed using an expensive laser sensor or two or more cameras, and a process consuming much time such as stereo matching.

Figure 8:
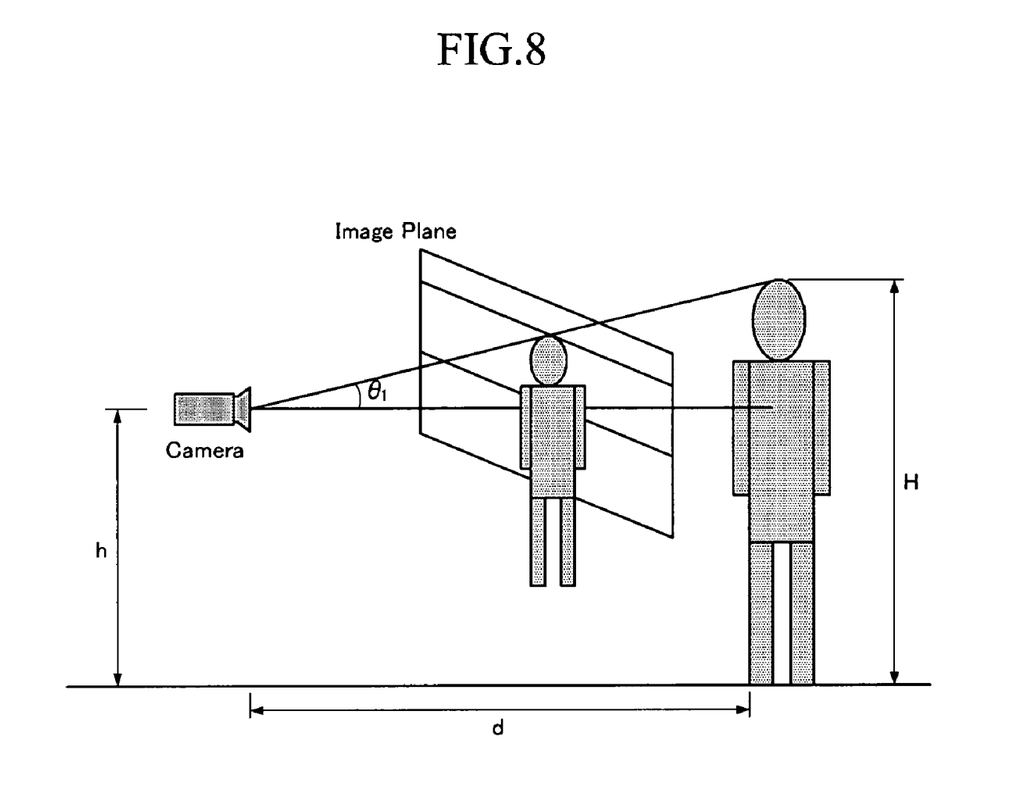
FIG. 8 illustrates a method for obtaining a distance when a full length of a user is not viewed, but feature information (for example, height) is known by authenticating a specific user recognizing.

As shown in FIG. 8, when a user ID has been authenticated so that the user height information is known, the distance d from the camera to the user can be obtained without Assumption 3 that the full length is shown, using the above described method.

That is, when the height H of the user is known, the distance d from the camera to the user can be obtained in the following Equation 10 so that useful information for tracking or the like may be provided.

$$d = \frac{H - h}{\tan\theta_1}$$ equation 10

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The biometric recognizing method according to an exemplary embodiment of the present invention can authenticate a user identity even when the user freely moves in comparison with the conventional biometric recognizing method.

Particularly, height varies greatly in a predetermined family or group so that the system can effectively perceive a predetermined user. Also, height can be used to authenticate a predetermined user even when the user is viewed from the rear thereof.

In addition, when height is used to authenticate a predetermined user, the height corresponding to the 3D information can be effectively obtained using a single camera. Accordingly, the distance d from the camera to the user can be obtained with the height so that useful information for tracking or the like may be provided.

What is claimed is:

1. A user recognizing system for determining a predetermined user based on a user image, comprising:
a user information database including user ID and corresponding user feature information;
an image input unit for digitalizing the user image into user image data and transmitting the digitalized user image data into the system;
a feature recognizing unit for extracting first user feature being absolutely unique biometric information and second user feature information being unique semibiometric information under a predetermined condition from the user image data transmitted from the image input unit, and respectively generating a first probability and a second probability that the extracted first and second user feature information determine the predetermined user based on the information stored in the user information database; and
a user determination unit for finally determining a user ID of the user image by combining the first probability and the second probability,
wherein the feature recognizing unit includes a first feature recognizing unit for generating the first probability based on factors including whether extracting the first user feature satisfied a standard of the feature recognizing unit and a second feature recognizing unit for generating the second probability based on factors including differences in semibiometric information among all users of a predetermined user group,
wherein the first probability or the second probability is given as follows:

$$P_{X,Ui} = \frac{P'_{X,Ui}}{\sum_{k=1}^{N} P'_{X,Uk}},$$

$$\text{if only } P(x) = \frac{1}{\sigma\sqrt{2\pi}} e^{-(x-x_f^2)/(2\sigma^2)},$$

$$\mu < X_i, P'_{X,Ui} = 0.5 - \int_{\mu}^{X_i} P(x)dx,$$

$$\mu = X_i, P'_{X,Ui} = 0.5,$$

$$\mu > X_i, P'_{X,Ui} = 0.5 + \int_{X_i}^{\mu} P(x)dx,$$

where $U_i$ is a predetermined user i, $X_i$ is an X feature value of the predetermined user i, $P_{X,Ui}$ is a probability that the measured X feature value corresponds to the predetermined user i, X is the first feature or the second feature, μ is the measured result of the first feature or the second feature, N is a total user number within a predetermined user group.

2. The user recognizing system of claim 1, wherein the first feature recognizing unit or the second feature recognizing unit set $P_{X,Ui}$ as follows when valid measurement results are not obtained $$P_{X,Uk} = 1/N (k=1,2,\ldots,N).$$

3. The user recognizing system of claim 1, wherein the user determination unit calculates a probability $P_U$, in which a predetermined user Ui will be determined for all users of a predetermined group stored at in the user information database and authenticates a user ID of the maximum $P_{Ui}$ value as the predetermined user, $$P_{Ui} = \frac{P'_{Ui}}{\sum_{k=1}^{N} P'_{Uk}}$$

$$P'_{Ui} = P_{X_1,Ui} \cdot P_{X_2,Ui},$$

where $P_{X_1,Ui}$ is the first probability and $P_{X_2,Ui}$ the second probability.

4. The user recognizing system of claim 1, wherein the first feature includes a user face and the second feature includes a user height.

5. A user recognizing system for determining a predetermined user based on a user image, comprising:
a user information database including user ID and corresponding user feature information;
an image input unit for digitalizing the user image into user image data and transmitting the digitalized user image data into the system;
a feature recognizing unit for extracting first user feature being absolutely unique biometric information and second user feature information being unique semibiometric information under a predetermined condition from the user image data transmitted from the image input unit, and respectively generating a first probability and a second probability that the extracted first and second user feature information determine the predetermined user based on the information stored in the user information database; and
a user determination unit for finally determining a user ID of the user image by combining the first probability and the second probability,
wherein the feature recognizing unit includes a first feature recognizing unit for generating the first probability based on factors including whether extracting the first user feature satisfied a standard of the feature recognizing unit and a second feature recognizing unit for generating the second probability based on factors including differences in semibiometric information among all users of a predetermined user group,
wherein the second feature recognizing unit generates the second probability as follows by measuring a user height when the camera views upward with respect to a line parallel to the ground, $$H = h + \frac{h \cdot \tan(\theta_1 + \theta_2)}{\tan(\theta_3)},$$

where H is a user height, h is a height ranging from the ground to the camera, $\theta_1$ is an angle formed between a line of the eye direction of the camera and a line connecting the center of the camera with the top of an upper half of the user, $\theta_2$ is a tilt angle of the camera, and $\theta_3$ is an angle formed between a line parallel to the ground and a line connecting the center of the camera with the ground.

6. A user recognizing system for determining a predetermined user based on a user image, comprising:

a user information database including user ID and corresponding user feature information;

an image input unit for digitalizing the user image into user image data and transmitting the digitalized user image data into the system;

a feature recognizing unit for extracting first user feature being absolutely unique biometric information and second user feature information being unique semibiometric information under a predetermined condition from the user image data transmitted from the image input unit, and respectively generating a first probability and a second probability that the extracted first and second user feature information determine the predetermined user based on the information stored in the user information database; and a user determination unit for finally determining a user ID of the user image by combining the first probability and the second probability, wherein the feature recognizing unit includes a first feature recognizing unit for generating the first probability based on factors including whether extracting the first user feature satisfied a standard of the feature recognizing unit and a second feature recognizing unit for generating the second probability based on factors including differences in semibiometric information among all users of a predetermined user group, wherein the second feature recognizing unit generates the second probability by measuring a user height as follows when the camera views downward in respect of a line parallel to the ground, $$H = h + \frac{h \cdot \tan(\theta_1)}{\tan(\theta_2 + \theta_3)},$$

where H is a user height, h is a height ranging from the ground to the camera, $\theta_1$ is an angle formed between a line parallel to the ground and a line connecting the center of the camera with the top of an upper half of the user, $\theta_2$ is a tilt angle of the camera, and $\theta_3$ is an angle formed between a line of the eye direction of the camera and a line connecting the center of the camera with the ground.

7. The user recognizing system of claim 5, wherein the distance d from the camera to the user can be obtained as follows when the height H of the user is known, $$d = \frac{H - h}{\tan\theta_1},$$

where H is a user height, h is a height ranging from the ground to the camera, and $\theta_1$ is an angle formed between a line parallel to the ground and a line connecting the center of the camera with the top of an upper half of the user.

* * * * *